(12) United States Patent
Baker-Ostiguy (10) Patent No.: US 11,674,406 B2
(45) Date of Patent: Jun. 13, 2023

(54) VARIABLE GAP BETWEEN IMPELLER ROTOR AND STATIC STRUCTURE

(71) Applicant: Pratt & Whitney Canada Corp., Longueuil (CA)

(72) Inventor: Simon Baker-Ostiguy, Montreal (CA)

(73) Assignee: Pratt & Whitney Canada Corp., Longueuil (CA)

( * ) Notice: Subject to any disclaimer, the term of this patent is extended or adjusted under 35 U.S.C. 154(b) by 0 days.

(21) Appl. No.: 17/395,882

(22) Filed: Aug. 6, 2021

(65) Prior Publication Data

US 2023/0044147 A1 Feb. 9, 2023

(51) Int. Cl.
*F01D 11/18* (2006.01)
*F04D 29/16* (2006.01)
(Continued)

(52) U.S. Cl.
CPC .............. *F01D 11/18* (2013.01); *B01D 19/00* (2013.01); *B01D 19/0042* (2013.01); *B01D 19/0052* (2013.01); *B04B 5/12* (2013.01); *F01D 5/043* (2013.01); *F01D 5/048* (2013.01); *F01D 11/02* (2013.01); *F01D 11/025* (2013.01); *F04D 29/083* (2013.01); *F04D 29/086* (2013.01); *F04D 29/162* (2013.01); *F04D 29/167* (2013.01); *F04D 29/2266* (2013.01); *F04D 29/242* (2013.01); *F04D 29/245* (2013.01); *F04D 29/30* (2013.01); *F05D 2250/11* (2013.01); *F05D 2250/12* (2013.01);
(Continued)

(58) Field of Classification Search
CPC .......... F01D 5/043; F01D 5/048; F01D 11/02; F01D 11/025; F01D 11/18; F05D 2260/608; F05D 2250/11; F05D 2250/242; F05D 2250/292; F04D 29/083; F04D 29/086; F04D 29/162; F04D 29/167; F04D 29/2266; F04D 29/242; F04D 29/245; F04D 29/30; B04B 5/12; B01D 19/00; B01D 19/0042; B01D 19/0052
USPC .............. 415/173.5, 174.5, 173.6; 494/38, 41
See application file for complete search history.

(56) References Cited

U.S. PATENT DOCUMENTS 2,296,701 A 9/1942 Butler
4,152,092 A * 5/1979 Swearingen ............ F01D 11/02
277/423

(Continued)

OTHER PUBLICATIONS

EP search report for EP22188256.6 dated Jan. 25, 2023.

*Primary Examiner* — Christopher Verdier
(74) *Attorney, Agent, or Firm* — Getz Balich LLC (57) ABSTRACT

An assembly is provided for a turbine engine. This assembly includes a static structure and an impeller rotor housed within the static structure. The impeller rotor includes a vane structure and a shroud. The vane structure includes a first sidewall, a second sidewall and a plurality of vanes arranged circumferentially about a rotational axis. The vanes include a first vane. The first vane includes a first portion, a second portion and a third portion. The first portion is axially between the first sidewall and the second sidewall. The second portion is radially between the first sidewall and the shroud. The third portion is radially between the second sidewall and the shroud. The shroud circumscribes the vane structure. A gap is formed by and extends between the shroud and the static structure. A dimension of the gap changes as the gap extends along the shroud.

16 Claims, 9 Drawing Sheets

(51) Int. Cl.
   *B01D 19/00*   (2006.01)
   *F01D 11/02*   (2006.01)
   *F04D 29/08*   (2006.01)
   *F01D 5/04*    (2006.01)
   *F04D 29/24*   (2006.01)
   *F04D 29/30*   (2006.01)
   *F04D 29/22*   (2006.01)
   *B04B 5/12*    (2006.01)

(52) U.S. Cl.
   CPC .. *F05D 2250/292* (2013.01); *F05D 2260/608* (2013.01); *F05D 2300/50212* (2013.01)

(56) References Cited

U.S. PATENT DOCUMENTS

| | | |
|---|---|---|
| 4,217,120 A | 8/1980 | Reynolds |
| 4,569,638 A | 2/1986 | Harker |
| 5,019,136 A * | 5/1991 | Elonen ................ F04D 29/428 415/168.1 |
| 5,232,338 A * | 8/1993 | Vincent de Paul ..... F01D 5/145 415/173.5 |
| 6,039,535 A * | 3/2000 | Kobayashi ............ F04D 29/102 415/230 |
| 7,252,474 B2 | 8/2007 | Belokon |
| 7,377,110 B2 | 5/2008 | Sheridan |
| 7,909,578 B2 | 3/2011 | Nishiyama |
| 8,985,277 B2 | 3/2015 | Hetherington |
| 2015/0176492 A1 | 6/2015 | Cutrara |
| 2016/0218590 A1* | 7/2016 | Oxman ................ H02K 7/1823 |
| 2019/0234416 A1* | 8/2019 | Morinaka ............ F01D 11/02 |
| 2019/0338705 A1 | 11/2019 | Reid |
| 2021/0356077 A1* | 11/2021 | Daniel ............... B01D 19/0052 |
| 2022/0088523 A1 | 3/2022 | Parikh |

\* cited by examiner

VARIABLE GAP BETWEEN IMPELLER ROTOR AND STATIC STRUCTURE

BACKGROUND OF THE DISCLOSURE

1. Technical Field

This disclosure relates generally to rotational equipment and, more particularly, to a rotational equipment device with an impeller.

2. Background Information

Rotational equipment such as a gas turbine engine may include a deaerator for separating a fluid into its liquid and gas components. Various types and configurations of deaerators are known in the art. While these known deaerators have various benefits, there is still room in the art for improvement. For example, there is a need for reduced leakage around an impeller rotor of a deaerator.

SUMMARY OF THE DISCLOSURE

According to an aspect of the present disclosure, an assembly is provided for a turbine engine. This turbine engine assembly includes a static structure and an impeller rotor housed within the static structure. The impeller rotor includes a vane structure and a shroud. The vane structure includes a first sidewall, a second sidewall and a plurality of vanes arranged circumferentially about a rotational axis. The vanes include a first vane. The first vane includes a first portion, a second portion and a third portion. The first portion is axially between the first sidewall and the second sidewall. The second portion is radially between the first sidewall and the shroud. The third portion is radially between the second sidewall and the shroud. The shroud circumscribes the vane structure. A gap is formed by and extends between the shroud and the static structure. A dimension of the gap changes as the gap extends along the shroud.

According to another aspect of the present disclosure, another assembly is provided for a turbine engine. This turbine engine assembly includes a static structure with a cavity surface. The rotational equipment assembly also include an impeller rotor housed within the static structure. The impeller rotor includes a plurality of rotor vanes and a shroud. The rotor vanes are arranged circumferentially about a rotational axis. The shroud circumscribes and is connected to the rotor vanes. The shroud includes a first shroud surface, a second shroud surface and a third shroud surface extending between the first shroud surface and the second shroud surface. The shroud extends in a first direction to the first shroud surface and the second shroud surface. The first shroud surface is parallel with the cavity surface. The first shroud surface is separated from the cavity surface in the first direction by a gap. The second shroud surface is parallel with the cavity surface. The second shroud surface is separated from the cavity surface in the first direction by the gap.

According to another aspect of the present disclosure, another assembly is provided for a turbine engine. This turbine engine assembly includes a static structure and an impeller rotor housed within the static structure. The impeller rotor includes a plurality of rotor vanes and a shroud. The rotor vanes are arranged circumferentially about a rotational axis. The shroud circumscribes and is connected to the rotor vanes. The shroud includes a base, a first seal element and a second seal element. The first seal element projects in a first direction out from the base towards the static structure. The first seal element is separated from the static structure by a first gap. The second seal element projects in a second direction out from the base towards the static structure. The second seal element is separated from the static structure by a second gap.

The first direction may be a radial direction.

The first direction may be an axial direction.

The shroud may include a base and a protrusion. The protrusion may project out from the base towards the static structure. The dimension may have a first value when measured between the base and the static structure. The dimension may have a second value when measured between the protrusion and the static structure that is less than the first value.

The protrusion may have a rectangular cross-sectional geometry.

The protrusion may have a cross-sectional geometry that tapers as the protrusion projects away from the base and towards the static structure.

The shroud may extend axially along the rotational axis between an upstream end and a downstream end. The protrusion may be arranged at the upstream end and projects axially out from the base.

The shroud may extend axially along the rotational axis between an upstream end and a downstream end. The protrusion may be arranged at the downstream end and may project axially out from the base.

The protrusion may be arranged at a radial outer side of the shroud and may project radially out from the base.

The protrusion may be a first protrusion, and this first protrusion may project out from the base towards the static structure in a first direction. The shroud may also include a second protrusion, and this second protrusion may project out from the base towards the static structure in a second direction that is different than the first direction.

The protrusion may be a first protrusion, and this first protrusion may project out from the base towards the static structure in a first direction. The shroud may also include a second protrusion, and this second protrusion may project out from the base towards the static structure in the first direction.

A groove may project into the static structure from a cavity surface to a groove surface. The dimension may have a first value when measured between the impeller rotor and the groove surface. The dimension may have a second value when measured between the impeller rotor and the cavity surface that is less than the first value.

The groove may project radially outward into the static structure from the cavity surface to the groove surface.

The groove may project axially into the static structure from the cavity surface to the groove surface.

The static structure may include a base and a ring. A groove may project into the base from a cavity surface formed by the base. The ring may be arranged within the groove and has a ring surface. The dimension may have a first value when measured between the shroud and the cavity surface. The dimension may have a second value when measured between the shroud and the ring surface that is different than the first value during at least a first mode of operation.

The dimension may have a third value when measured between the shroud and the ring surface that is different than the second value during at least a second mode of operation.

The base may be configured from or otherwise include first material with a first coefficient of thermal expansion. The ring may be configured from or otherwise include second material with a second coefficient of thermal expansion that is different than the first coefficient of thermal expansion.

The impeller rotor may be configured as or otherwise include a deaerator impeller rotor.

The present disclosure may include any one or more of the individual features disclosed above and/or below alone or in any combination thereof.

The foregoing features and the operation of the invention will become more apparent in light of the following description and the accompanying drawings.

DETAILED DESCRIPTION

Figure 1:
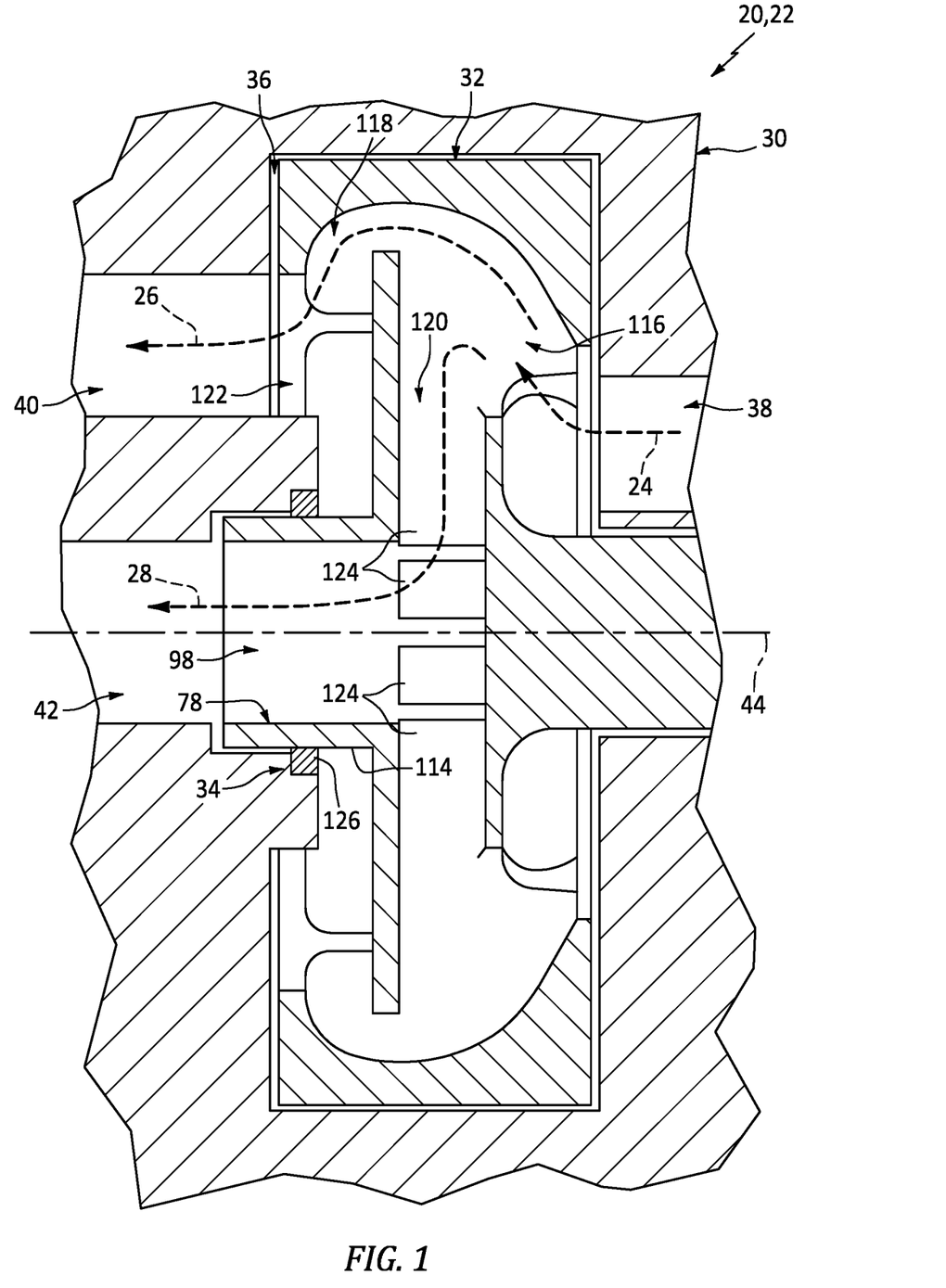
FIG. 1 is a side sectional illustration of a portion of an assembly for a turbine engine.

FIG. 1 illustrates an assembly 20 for a gas turbine engine. This turbine engine assembly 20 of FIG. 1 forms a deaerator 22 for the turbine engine. This deaerator 22 is configured to separate a fluid flow 24 with a liquid component and a gas component substantially into a separate liquid component flow 26 and a separate gas component flow 28. The deaerator 22 may therefore also be referred to as a liquid-gas separator; e.g., a lubricant-air separator (also referred to as a de-oiler) where the liquid component is or otherwise includes lubricant (e.g., oil) and where the gas component is or otherwise includes air. The turbine engine assembly 20/the deaerator 22 of FIG. 1 includes a static structure 30 and a deaerator impeller rotor 32. The deaerator 22 of FIG. 1 also includes a seal assembly 34.

Figure 2:
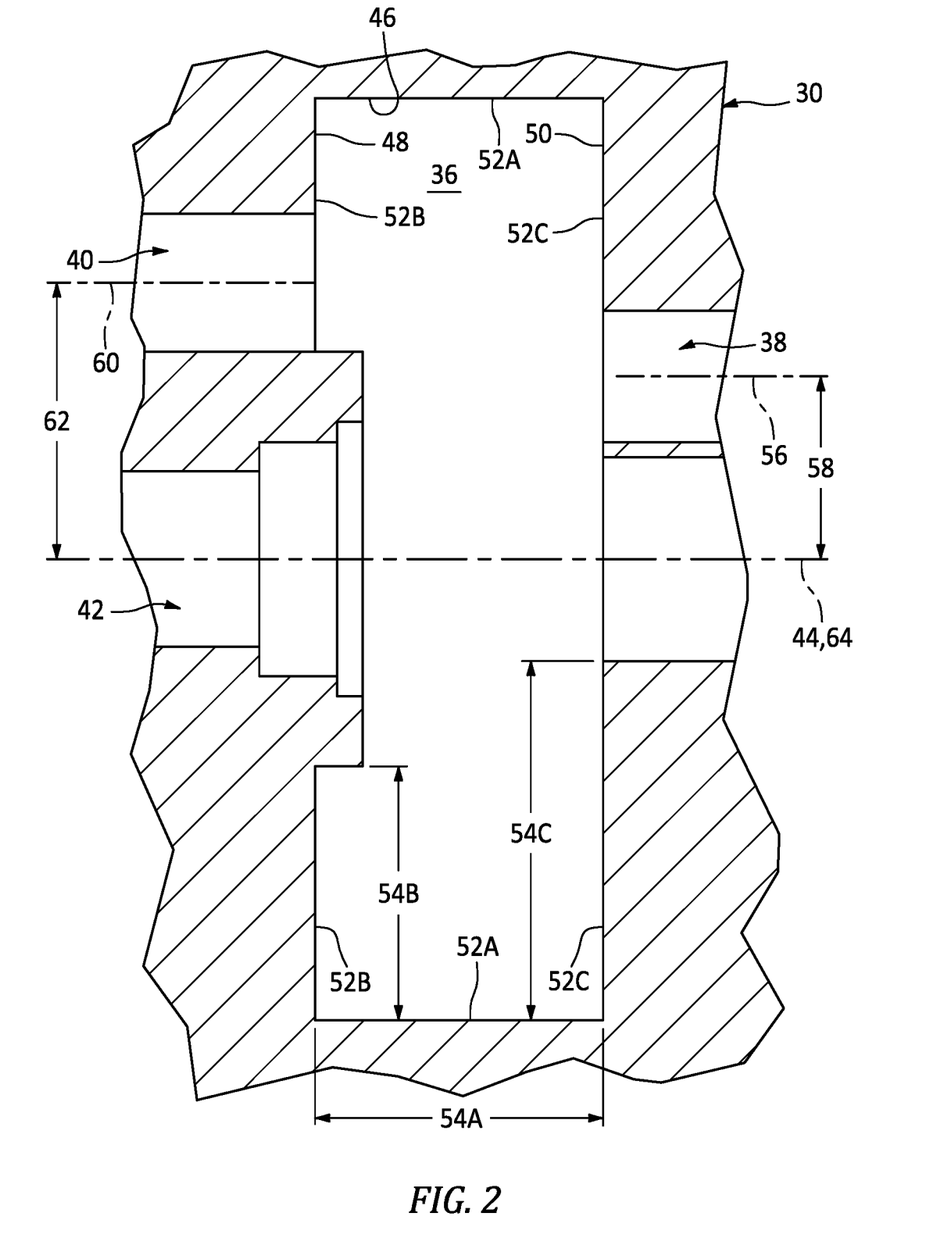
FIG. 2 is a side sectional illustration of a portion of a static structure.

The static structure 30 may be configured as a dedicated housing for the deaerator components 32 and 34; e.g., a deaerator case. The static structure 30 may alternatively be configured to support and/or house one or more other components of the turbine engine in addition to housing the deaerator components 32 and 34. Referring to FIG. 2, the static structure 30 includes an impeller rotor cavity 36, a fluid inlet passage 38, a liquid outlet passage 40 and a gas outlet passage 42.

The rotor cavity 36 extends radially out from a rotational axis 44 (e.g., an axial centerline) of the deaerator 22 within the static structure 30 to an outer side 46 of the rotor cavity 36. The rotor cavity 36 extends (e.g., completely) circumferentially around the rotational axis 44. The rotor cavity 36 extends axially along the rotational axis 44 within the static structure 30 between and to a first side 48 of the rotor cavity 36 and a second side 50 of the rotor cavity 36.

An outer portion of the rotor cavity 36 is formed by a plurality of cavities surfaces 52A-C (generally referred to as "52")—interior surfaces of the static structure 30. The outer cavity surface 52A is arranged at (e.g., on, adjacent or proximate) the cavity outer side 46. The outer cavity surface 52A may be an uninterrupted (or axially interrupted as described below) cylindrical surface. The outer cavity surface 52A of FIG. 2 extends axially along the rotational axis 44 between and to the first side cavity surface 52B and the second side cavity surface 52C. The first side cavity surface 52B is arranged at the cavity first side 48. The first side cavity surface 52B may be an uninterrupted (or radially interrupted as described below) annular surface that is perpendicular to the rotational axis 44. The first side cavity surface 52B of FIG. 2 projects radially inward from the outer cavity surface 52A at the cavity first side 48. The second side cavity surface 52C is arranged at the cavity second side 50. The second side cavity surface 52C may be an uninterrupted (or radially interrupted as described below) annular surface that is perpendicular to the rotational axis 44. The second side cavity surface 52C of FIG. 2 projects radially inward from the outer cavity surface 52A at the cavity second side 50.

A radial height 54C of the second side cavity surface 52C of FIG. 2 is different (e.g., greater) than a radial height 54B of the first side cavity surface 52B. The radial height 54B may be different (e.g., smaller) than or equal to an axial length 54A of the outer cavity surface 52A. The radial height 54C may be different than (e.g., greater) than the axial length 54A. The present disclosure, however, is not limited to the foregoing exemplary dimensional relationships.

The fluid inlet passage 38 extends axially along the rotational axis 44 within and/or into the static structure 30 to the rotor cavity 36. An outlet of the fluid inlet passage 38 is fluidly coupled with the rotor cavity 36. The fluid inlet passage 38 is located to the cavity second side 50. A centerline 56 of the fluid inlet passage 38 of FIG. 2 (e.g., at the outlet of the fluid inlet passage 38) is radially offset from the rotational axis 44 by a radial distance 58. While the fluid inlet passage centerline 56 is shown in FIG. 2 as parallel with the rotational axis 44, the present disclosure is not limited to such an exemplary arrangement. For example, in other embodiments, the fluid inlet passage centerline 56 and, thus, the fluid inlet passage 38 (e.g., at the outlet of the fluid inlet passage 38) may be angularly offset from the rotational axis 44 and/or angularly offset from the cavity second side 50/the second side cavity surface 52C by an acute or an obtuse angle.

The liquid outlet passage 40 extends axially along the rotational axis 44 within and/or into the static structure 30 to the rotor cavity 36. An inlet to the liquid outlet passage 40 is fluidly coupled with the rotor cavity 36. The liquid outlet passage 40 is located to the cavity first side 48. A centerline 60 of the liquid outlet passage 40 of FIG. 2 (e.g., at the inlet to the liquid outlet passage 40) is radially offset from the rotational axis 44 by a radial distance 62. This distance 62 may be different (e.g., greater) than the distance 58. The present disclosure, however, is not limited to the foregoing exemplary dimensional relationship. While the liquid outlet passage centerline 60 is shown in FIG. 2 as parallel with the rotational axis 44, the present disclosure is not limited to such an exemplary arrangement. For example, in other embodiments, the liquid outlet passage centerline 60 and, thus, the liquid outlet passage 40 (e.g., at the inlet of the liquid outlet passage 40) may be angularly offset from the rotational axis 44 and/or angularly offset from the cavity first side 48/first side cavity surface 52B by an acute or an obtuse angle.

The gas outlet passage 42 extends axially along the rotational axis 44 within and/or into the static structure 30 to the rotor cavity 36. An inlet to the gas outlet passage 42 is fluidly coupled with the rotor cavity 36. The gas outlet passage 42 is located to the cavity first side 48. A centerline 64 of the gas outlet passage 42 of FIG. 2 may be aligned (e.g., coaxial) with the rotational axis 44. With this arrangement, the gas outlet passage 42 is positioned radially inward of the liquid outlet passage 40, and the fluid inlet passage 38 is generally aligned radially between the outlet passages 40 and 42. The present disclosure, however, is not limited to the foregoing exemplary spatial relationships.

Figure 3:
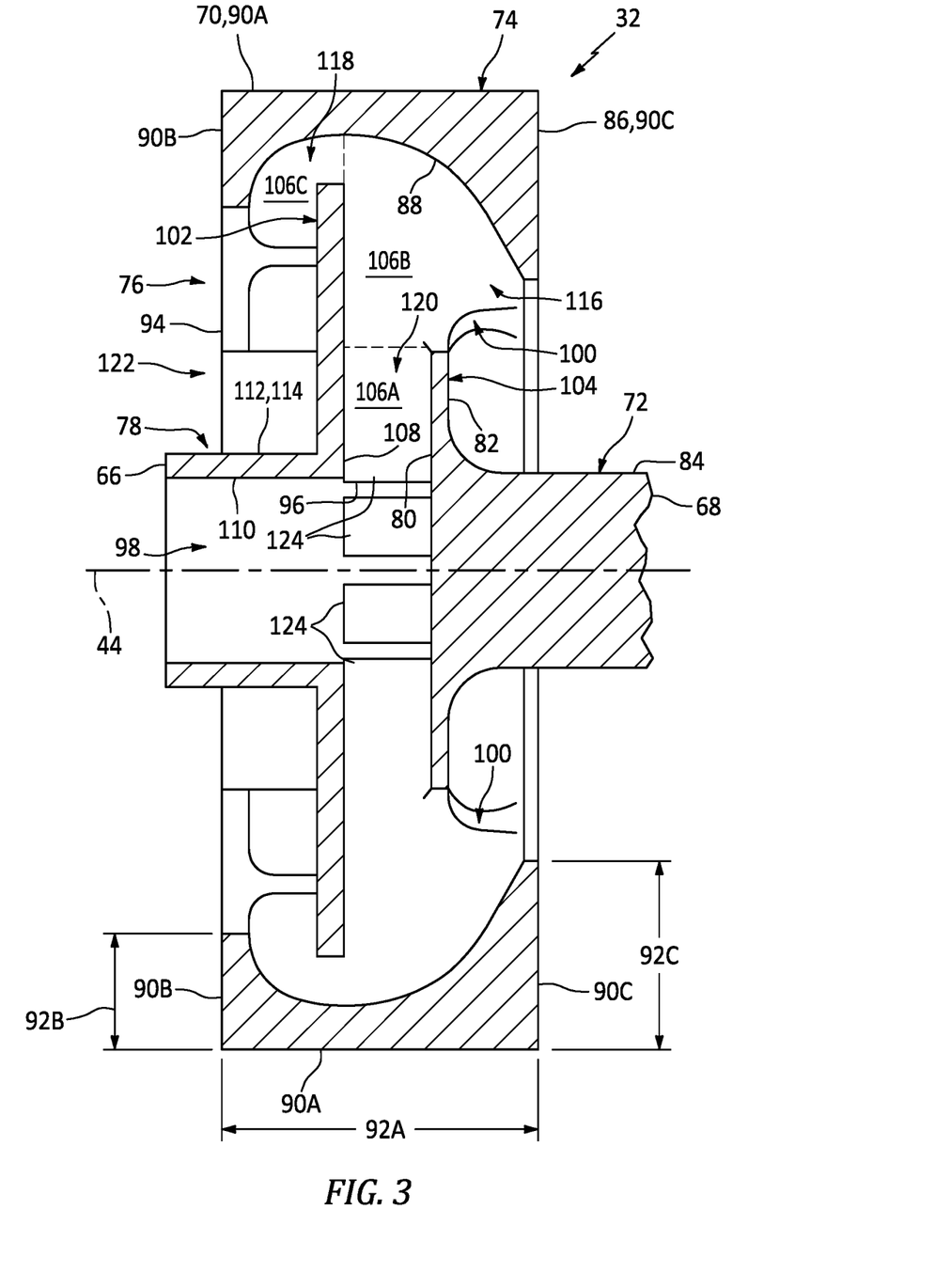
FIG. 3 is a side sectional illustration of a portion of an impeller rotor.

Referring to FIG. 3, the impeller rotor 32 is rotatable about the rotational axis 44. The impeller rotor 32 extends axially along the rotational axis 44 between and to a first side 66 of the impeller rotor 32 and a second side 68 (generally depicted in FIG. 3) of the impeller rotor 32. The impeller rotor 32 extends (e.g., completely) circumferentially around the rotational axis 44 providing the impeller rotor 32 with a full-hoop body. The impeller rotor 32 extends radially out (e.g., away from the rotational axis 44) to an outer side 70 of the impeller rotor 32. The impeller rotor 32 of FIG. 3 includes an inner impeller rotor hub 72, an outer impeller rotor shroud 74 and a vane array structure 76. The impeller rotor 32 may also include an impeller rotor seal land 78.

The rotor hub 72 extends axially along the rotational axis 44 between and to the rotor second side 68 and a first side 80 of the rotor hub 72. The hub first side 80 of FIG. 3 is axially offset (e.g., recessed) from the rotor first side 66. The hub first side 80 of FIG. 3, for example, is located axially at (e.g., on, adjacent or proximate) a second side 82 of the vane array structure 76. The rotor hub 72 extends (e.g., completely) circumferentially around the rotational axis 44 providing the rotor hub 72 with a tubular body. The rotor hub 72 extends radially to an outer side 84 of the rotor hub 72. The rotor hub 72 of FIG. 3 is configured as a solid body; e.g., does not include a central through-bore. The rotor hub 72, however, may alternatively be configured as a hollow body in other embodiments.

The rotor shroud 74 extends axially along the rotational axis 44 between and to (or about) the rotor first side 66 (e.g., an upstream end of the rotor shroud 74) and a second side 86 of the rotor shroud 74 (e.g., a downstream end of the rotor shroud 74). The shroud second side 86 of FIG. 3 is axially offset (e.g., recessed) from the rotor second side 68. A portion of the rotor shroud 74 at the shroud second side 86 may axially overlap a portion of the rotor hub 72 at the hub first side 80. The rotor shroud 74 extends (e.g., completely) circumferentially around the rotational axis 44 providing the rotor shroud 74 with a tubular body. The rotor shroud 74 extends radially between and to an inner side 88 of the rotor shroud 74 to the rotor outer side 70; e.g., an outer side of the shroud 74.

The rotor shroud 74 of FIG. 3 includes a plurality of shroud surfaces 90A-C (generally referred to as "90")—exterior surfaces of the impeller rotor 32 and its rotor shroud 74. The outer shroud surface 90A is arranged at the rotor outer side 70; e.g., a radial distal side of the rotor shroud 74. The outer shroud surface 90A may be an uninterrupted (or axially interrupted as described below) cylindrical surface. The outer shroud surface 90A of FIG. 3 extends axially along the rotational axis 44 between and to the first side shroud surface 90B and the second side shroud surface 90C. The first side shroud surface 90B is arranged at (or about) the rotor first side 66. The first side shroud surface 90B may be an uninterrupted (or radially interrupted as described below) annular surface that is perpendicular to the rotational axis 44. The first side shroud surface 90B of FIG. 3 projects radially inward from the outer shroud surface 90A at the rotor first side 66. The second side shroud surface 90C is arranged at the shroud second side 86. The second side shroud surface 90C may be an uninterrupted (or radially interrupted as described below) annular surface that is perpendicular to the rotational axis 44. The second side shroud surface 90C of FIG. 3 projects radially inward from the outer shroud surface 90A at the shroud second side 86.

A radial height 92C of the second side shroud surface 90C of FIG. 3 is different (e.g., greater) than a radial height 92B of the first side shroud surface 90B. One or both of these radial heights 92B and/or 92C may be different (e.g., smaller) than an axial length 92A of the outer shroud surface 90A. The present disclosure, however, is not limited to the foregoing exemplary dimensional relationships.

The vane array structure 76 extends axially along the rotational axis 44 between and to a first side 94 of the vane array structure 76 and the structure second side 82. The vane array structure 76 extends (e.g., completely) circumferentially around the rotational axis 44 providing the vane array structure 76 with a full-hoop body. The vane array structure 76 is arranged radially between and is connected to (e.g., formed integral with) the rotor hub 72 and the rotor shroud 74. An inner side 96 of the vane array structure 76 at least partially forms a rotor bore 98 within the impeller rotor 32. This rotor bore 98 projects axially along the rotational axis 44 into the impeller rotor 32 from the rotor first side 66 to, for example, the hub first side 80.

The vane array structure 76 of FIG. 3 includes a plurality of impeller rotor vanes 100, an axial first structure sidewall 102 and an axial second structure sidewall 104. The rotor vanes 100 are arranged circumferentially about the rotational axis 44 in an array. This array of rotor vanes 100 is located radially between (A) the rotor hub 72 and/or the seal land 78, and (B) the rotor shroud 74. The array of rotor vanes 100 is located axially adjacent and/or radially along the structure sidewalls 102 and 104. Each of the rotor vanes 100 of FIG. 3, for example, extends radially between and to the inner rotor components 72 and 78 and the rotor shroud 74. A radial inner portion 106A of each of the rotor vanes 100 extends axially along the rotational axis 44 between and to the first structure sidewall 102 and the second structure sidewall 104. The first structure sidewall 102 is disposed towards the structure first side 94. The second structure sidewall 104 is disposed towards the structure second side 82.

Each of the rotor vanes 100 may include a plurality vane portions. Each rotor vane 100 of FIG. 3, for example, includes the vane inner portion 106A, a radial intermediate portion 106B and a radial outer portion 106C. The vane inner portion 106A is arranged axially between the first structure sidewall 102 and the second structure sidewall 104. More particularly, the vane inner portion 106A extends axially between and to the structure sidewalls 102 and 104.

The vane inner portion 106A extends radially between and to (or about) an outer tip of the second structure sidewall 104 and the rotor bore 98/the structure inner side 96. The vane intermediate portion 106B is arranged radially between the second structure sidewall 104 and the rotor shroud 74. More particularly, the vane intermediate portion 106B extends radially between and to the outer tip of the second structure sidewall 104 and the shroud inner side 88. The vane intermediate portion 106B extends axially between and to (or about) the first structure sidewall 102 and the structure second side 82. The vane outer portion 106C is arranged radially between the first structure sidewall 102 and the rotor shroud 74. More particularly, the vane outer portion 106C extends radially between and to an outer tip of the first structure sidewall 102 and the shroud inner side 88. The vane outer portion 106C extends axially between and to (or about) the first structure sidewall 102 and the structure first side 94.

The seal land 78 of FIG. 3 extends axially along the rotational axis 44 between and to the rotor first side 66 and a second side 108 of the seal land 78. The land second side 108 of FIG. 3 is axially offset (e.g., recessed) from the rotor second side 68. The land second side 108 of FIG. 3, for example, is located axially at the first structure sidewall 102. The seal land 78 extends (e.g., completely) circumferentially around the rotational axis 44 providing the rotor hub 72 with a tubular body. The seal land 78 extends radially between and to an inner side 110 of the seal land 78 (e.g., the structure inner side 96) and an outside side 112 of the seal land 78. The seal land 78 may thereby also partially form the rotor bore 98 within the impeller rotor 32. The seal land 78 of FIG. 3 has an outer surface 114 at the land outer side 112. This outer surface 114 may be configured as a cylindrical surface.

The impeller rotor 32 of FIG. 3 includes a plurality of inlet passages 116, a plurality of liquid outlet passages 118 and a plurality of gas outlet passages 120. The inlet passages 116 are located towards the structure second side 82. Each of these inlet passages 116 is disposed circumferentially between a circumferentially neighboring (e.g., adjacent) pair of the rotor vanes 100; e.g., between a circumferentially neighboring pair of the vane intermediate portions 106B. Each of the inlet passages 116 projects axially along the rotational axis 44 into the impeller rotor 32 and its vane array structure 76 from the structure second side 82 to (or about) the first structure sidewall 102.

The liquid outlet passages 118 are located towards the structure first side 94. Each of the liquid outlet passages 118 is disposed circumferentially between a circumferentially neighboring (e.g., adjacent) pair of the rotor vanes 100; e.g., between a circumferentially neighboring pair of the vane outer portions 106C. Each of the liquid outlet passages 118 is fluidly coupled with a respective one of the inlet passages 116, and follows a respective (e.g., curved) trajectory within the vane array structure 76 to an outlet 122 (e.g., an annular outlet passage) at the structure first side 94. The trajectory of each respective liquid outlet passage 118 of FIG. 3 turns around the outer tip of the first structure sidewall 102. Each liquid outlet passage 118 fluidly couples the respective inlet passage 116 to the outlet 122.

The gas outlet passages 120 are located intermediately (e.g., midway) axially between the structure sidewalls 102 and 104. Each of the gas outlet passages 120 is disposed circumferentially between a circumferentially neighboring (e.g., adjacent) pair of the rotor vanes 100; e.g., between a circumferentially neighboring pair of the vane inner portions 106A. Each of the gas outlet passages 120 is fluidly coupled with a respective one of the inlet passages 116, and follows a respective (e.g., curved) trajectory within the vane array structure 76 (axially between and radially along the structure walls 102 and 104) to a respective outlet 124 at the structure inner side 96, which outlet 124 is fluidly coupled with the rotor bore 98. The trajectory of each respective gas outlet passage 120 of FIG. 3 turns around the outer tip of the second structure sidewall 104. Each gas outlet passage 120 fluidly couples the respective inlet passage 116 to the rotor bore 98.

With the foregoing arrangement, each respective set of passages 116, 118 and 120 forms a forked pathway within/through the impeller rotor 32. An inner leg of the forked pathway extends to the rotor bore 98. An outer leg of the forked pathway extends to the outlet 122.

Referring to FIG. 1, the seal assembly 34 includes the seal land 78 and a stationary seal element 126; e.g., a ring seal element. The seal element 126 extends (e.g., completely) circumferentially around the rotational axis 44 providing the seal element 126 with a full hoop (e.g., annular) body. The seal element 126 is configured to seal a (e.g., annular) gap radially between the static structure 30 and the seal land 78. The seal element 126, for example, may be configured as a (e.g., annular) lip seal. Of course, various other types of seal elements are known in the art, and the present disclosure is not limited to any particular ones thereof. The present disclosure is also not limited to a radial seal element. For example, in other embodiments, the seal elements may be arranged axially between the static structure 30 and the impeller rotor 32 and, for example, its seal land 78.

The seal element 126 is arranged with and fixedly mount to the static structure 30. The impeller rotor 32 is arranged within the rotor cavity 36 and housed within the static structure 30. The impeller rotor 32 is rotatable about the rotational axis 44. The impeller rotor 32, for example, may be rotatably supported within the static structure 30 by one or more bearings (not shown), which bearing may be mounted to the static structure 30 or another structure within the turbine engine. The inlet passages 116 are fluidly coupled with the fluid inlet passage 38. The liquid outlet passages 118 are fluidly coupled with the liquid outlet passage 40 through the outlet 122. The gas outlet passages 120 are fluidly coupled with the gas outlet passage 42 through the outlets 124 and the rotor bore 98.

Figure 4:
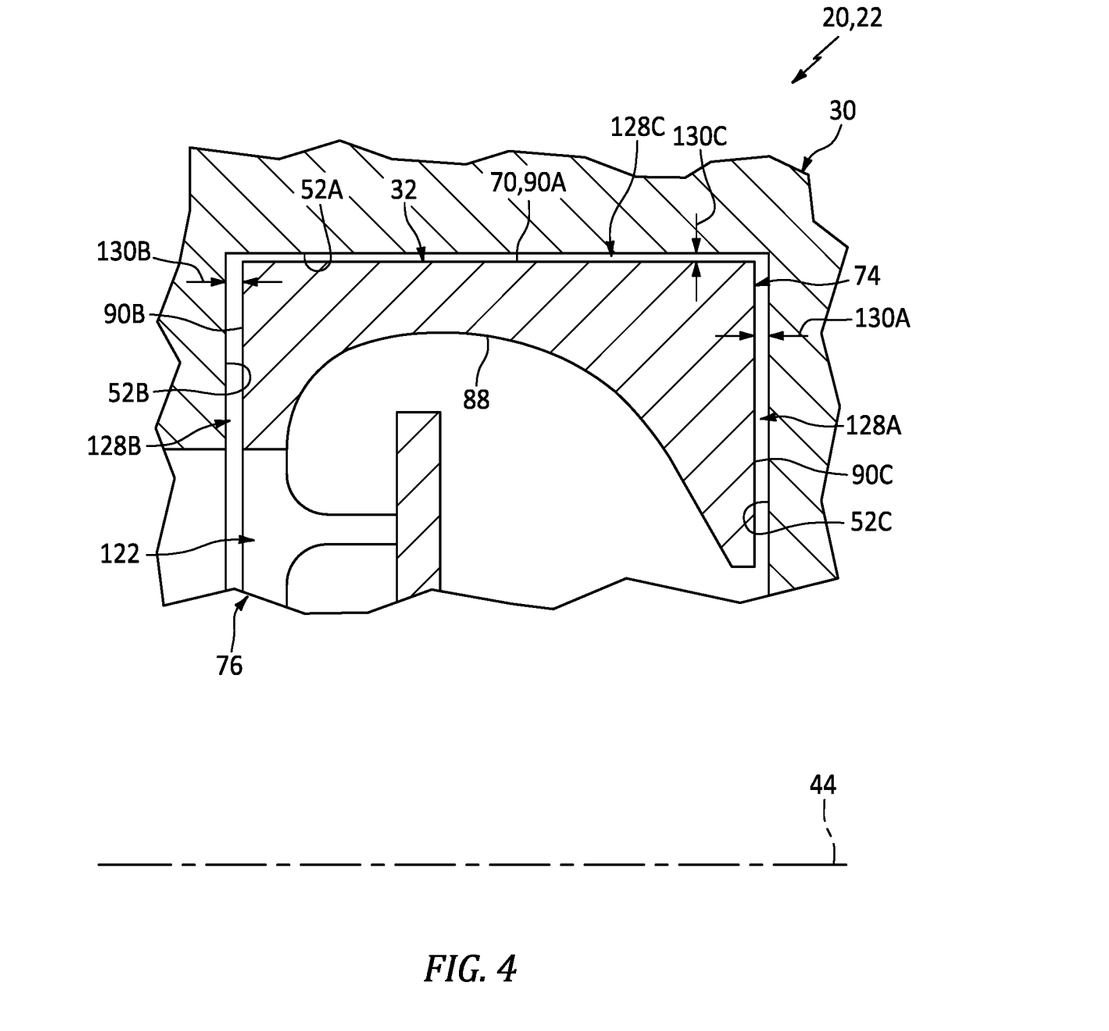
FIG. 4 is a side sectional illustration of an interface between the static structure and the impeller rotor.
Figure 5A:
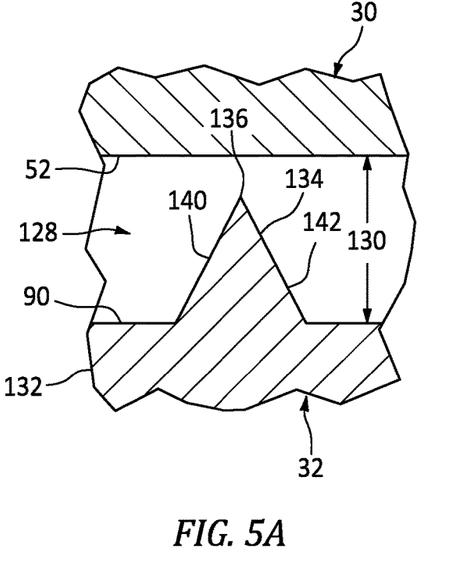
FIGS. 5A-D are side sectional illustrations of the interface between the static structure and the impeller rotor where the impeller rotor is configured with at least one protrusion.
Figure 5B:
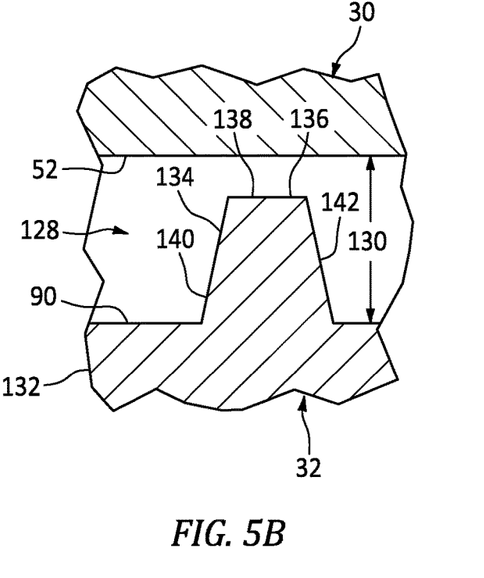
Figure 5C:
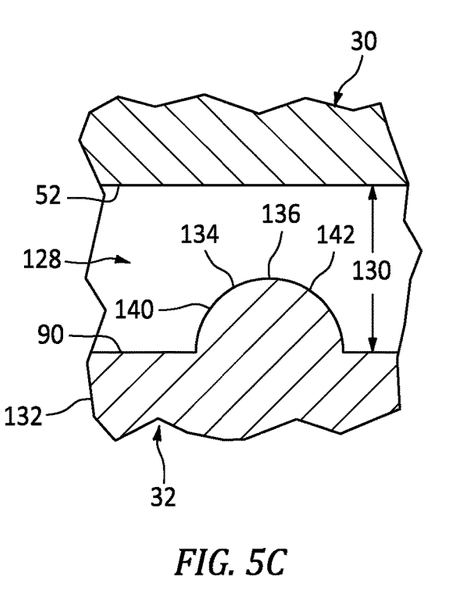
Figure 5D:
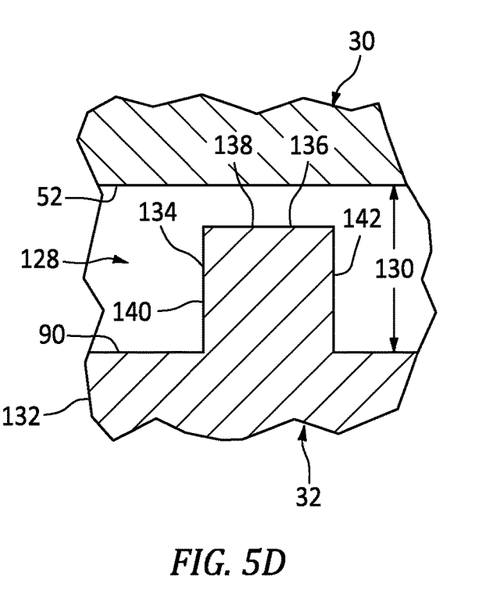

Referring to FIG. 4, the deaerator 22 includes one or more control gaps 128A-C (generally referred to as "128"); e.g., inter-impeller rotor-static structure gaps. Each of these gaps 128 is formed by and between at least (or only) the static structure 30 and the impeller rotor 32 and its rotor shroud 74. Each of these gaps 128 may extend (e.g., completely) circumferentially around the rotational axis 44 providing each respective gap 128 with a full-hoop (e.g., annular or tubular) geometry.

The outer gap 128C of FIG. 4 is formed by the outer cavity surface 52A and the outer shroud surface 90A. More particularly, this outer gap 128C extends radially between and to the outer cavity surface 52A and the outer shroud surface 90A. This outer gap 128C extends axially along (e.g., entire lengths of) the outer cavity surface 52A and the outer shroud surface 90A, for example between and to the (e.g., inlet) first side gap 128B and the (e.g., outlet) second side gap 128A.

The first side gap 128B of FIG. 4 is formed by the first side cavity surface 52B and the first side shroud surface 90B. More particularly, this first side gap 128B extends axially between and to the first side cavity surface 52B and the first side shroud surface 90B. This first side gap 128B extends radially along (e.g., entire lengths of) the first side cavity surface 52B and the first side shroud surface 90B, for example between and to (or about) the shroud inner side 88 and the rotor outer side 70.

The second side gap 128A of FIG. 4 is formed by the second side cavity surface 52C and the second side shroud surface 90C. More particularly, this second side gap 128A extends axially between and to the second side cavity surface 52C and the second side shroud surface 90C. This second side gap 128A extends radially along the second side cavity surface 52C and the second side shroud surface 90C, for example between and to (or about) the shroud inner side 88 and the rotor outer side 70.

During deaerator operation, fluid (e.g., some of the separated liquid such as lubricant) may leak radially out of the outlet 122 into the first side gap 128B between the rotor shroud 74 and the static structure 30. This leaked fluid may flow through the control gap 128C to the second side gap 128A, where the leaked fluid may re-enter the impeller rotor 32 and combine with incoming fluid flow. Dimensions 130A-C (generally referred to as "130") (e.g., heights) of the control gaps 128A-C may be selected to influence various properties of the leaked fluid flow. For example, to reduce a quantity of the fluid leaked across the control gaps 128, the dimensions 130 of the control gaps 128 may be decreased. The smaller the control gaps 128, the less fluid can flow across the control gaps 128. However, as the dimensions 130 of the control gaps 128 decrease, effects of fluid shear may increase. An increase in fluid shear may lead to generation of more heat and an increase in impeller rotor drag and, thus, increasing impeller rotor power demand.

The turbine engine assembly 20/the deaerator 22 of the present disclosure configures one or more of the control gaps 128 to (A) reduce fluid leakage flow through the control gaps 128 while also (B) reducing effects of fluid shear. For example, referring to FIGS. 5A-D, at least one of the control gaps 128 is configured with a variable control gap dimension 130; e.g., gap height. More particularly, the value of the control gap dimension 130 may change (e.g., increase and/or decrease) as the control gap 128 extends along a portion or an entirety of the shroud surface 90 and/or the cavity surface 52. The rotor shroud 74 of FIGS. 5A-D, for example, includes a shroud base 132 and at least one protrusion 134; e.g., a seal element such as, but not limited to, a knife edge seal or a labyrinth seal element. The protrusion 134 projects out from the shroud base 132 and its shroud surface 90 in a lateral direction (e.g., a direction perpendicular to the respective shroud surface 90, e.g., radially for the shroud surface 90A of FIG. 4 and axially for the shroud surfaces 90B, 90C of FIG. 4), to a distal end 136 (e.g., a tip, a pointed edge, etc.) of the protrusion 134. With this arrangement, a value of the control gap dimension 130 at a point along the shroud surface 90 is greater than a value of the control gap dimension 130 at the distal end 136. The control gap dimension 130 along the shroud surface 90 may be selected to reduce (e.g., minimize) effects of fluid shear, while the control gap dimension 130 along at the distal end 136 may be selected to reduce (e.g., minimize) fluid leakage flow.

The protrusion 134 may extend (e.g., completely) circumferentially around the rotational axis 44 (see FIGS. 1, 3 and 4) providing the protrusion 134 with a full-hoop (e.g., annular) body. The protrusion 134 has a sectional geometry when viewed, for example, in a plane parallel with and/or coincident with the rotational axis 44. This sectional geometry may be tapered (see FIGS. 5A, 5B and 5C) or non-tapered (see FIG. 5D). For example, the sectional geometry may be triangular (see FIG. 5A), trapezoidal (see FIG. 5B), arcuate such as semi-circular (see FIG. 5C), rectangular (see FIG. 5D), polygonal (see FIGS. 5A, 5B and 5D) or otherwise. The protrusion 134 may have a point at the distal end 136 as shown, for example, in FIG. 5A. Alternatively, the protrusion 134 may be blunt at the distal end 136 as shown, for example, in FIGS. 5B-D. The protrusion 134 of FIGS. 5B and 5D includes a protrusion surface 138 at its distal end 136. This protrusion surface 138 may be parallel with (or slightly angularly offset from) the shroud surface 90 and/or the cavity surface 52. The protrusion 134 of FIGS. 5B and 5D also includes one or more side surfaces 140 and 142. These side surfaces 140 and 142 extend in the lateral direction between the distal end 136 and the shroud surface 90. One or more of the side surfaces 140 and/or 142 may each be perpendicular to the shroud surface 90 (see FIG. 5D) or angularly offset from the shroud surface 90 (see FIGS. 5A and 5B).

Figure 6A:
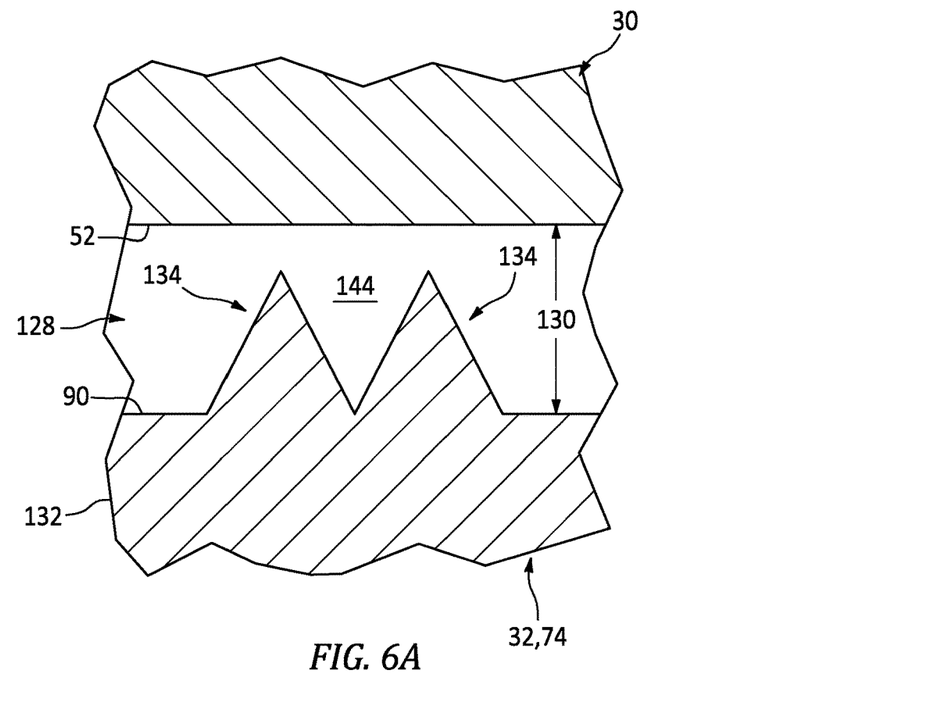
FIGS. 6A and 6B are partial side sectional illustrations of the interface between the static structure and the impeller rotor where the impeller rotor is configured with multiple protrusions.
Figure 6B:
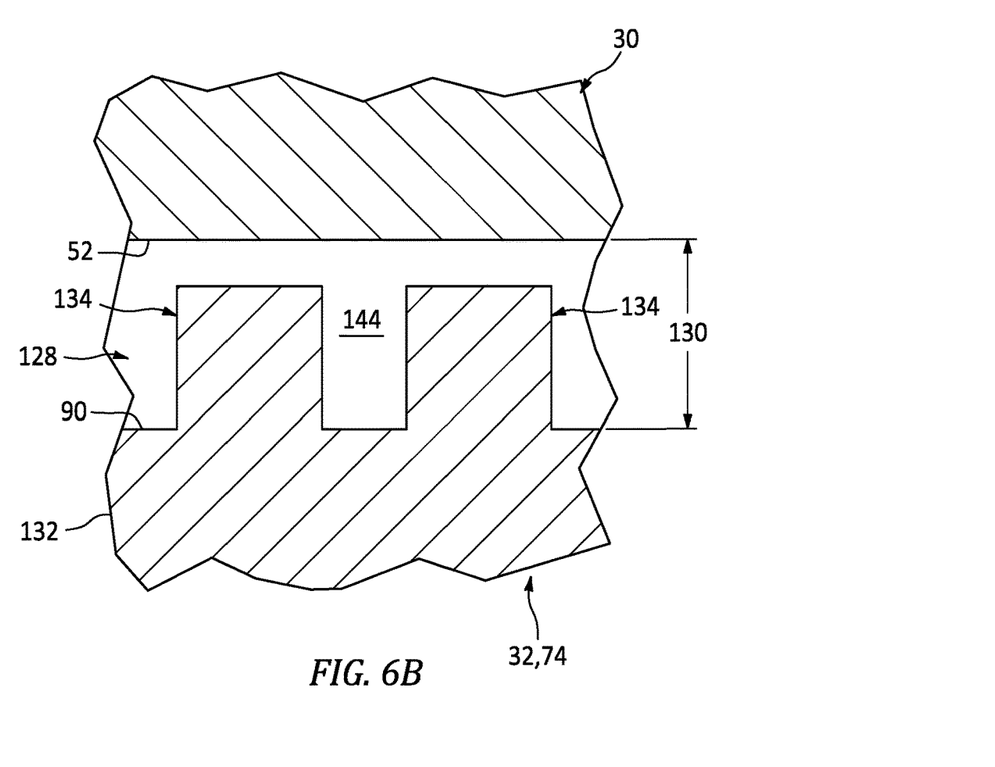

Referring to FIGS. 6A and 6B, the rotor shroud 74 may include a plurality of the protrusions 134 within the respective control gap 128. Referring to FIG. 6A, some of these protrusions 134 may be (e.g., directly) adjacent to one another. One of the protrusions 134, for example, may contact/be connected to its neighboring protrusion 134. Referring to FIG. 6B, some of the protrusions 134 may also or alternatively be spaced apart from one another. One of the protrusions 134, for example, may be separated from its neighboring protrusion 134 by a gap along, for example, the shroud surface 90 or a segment thereof. The protrusions 134 of FIGS. 6A and 6B may be arranged to capture a quantity of the fluid within an inter-protrusion groove 144, which groove 144 extends into the rotor shroud 74 to a respective groove surface (e.g., the shroud surface 90 or a segment thereof). The groove 144 may promote partial locational recirculation and/or otherwise delay the fluid flow through the control gap 128 resulting in a slight heating of the fluid passing through the respective control gap 128. This may be useful during certain modes of operation; e.g., at turbine engine startup where the liquid (e.g., lubricant) may be particularly viscous.

Figure 7A:
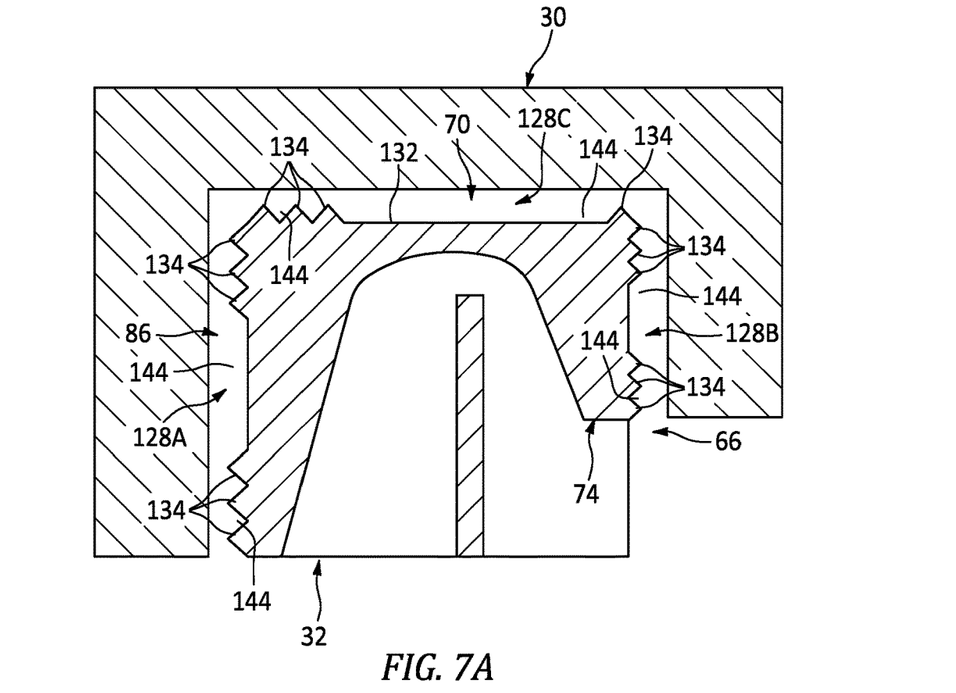
FIGS. 7A-C are partial side sectional illustrations of the interface between the static structure and the impeller rotor where the impeller rotor is configured with protrusions at various sides of its shroud.
Figure 7B:
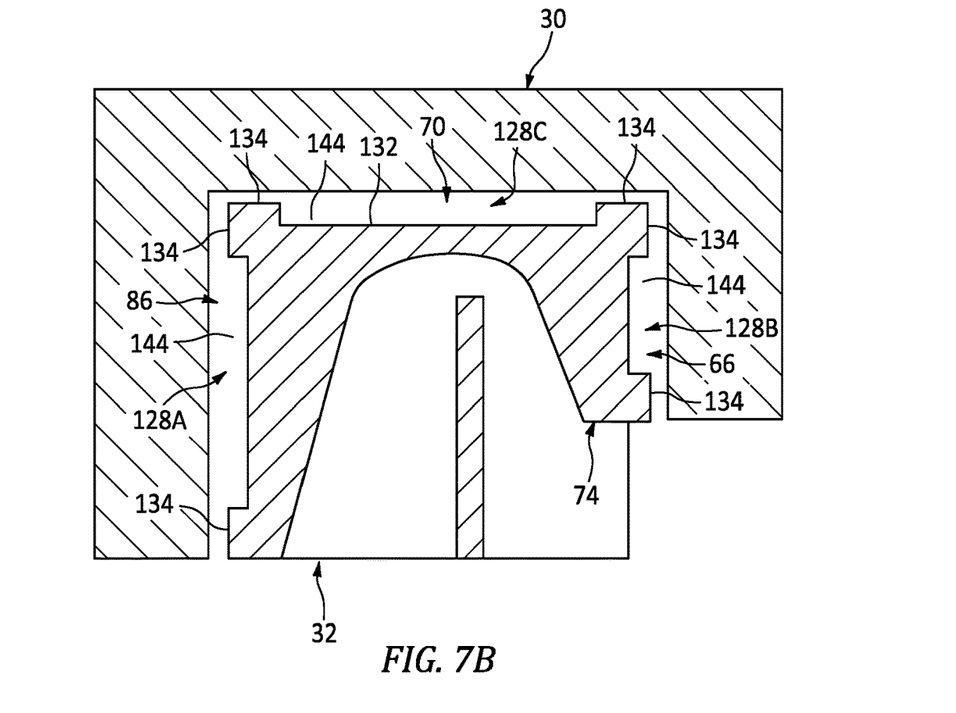
Figure 7C:
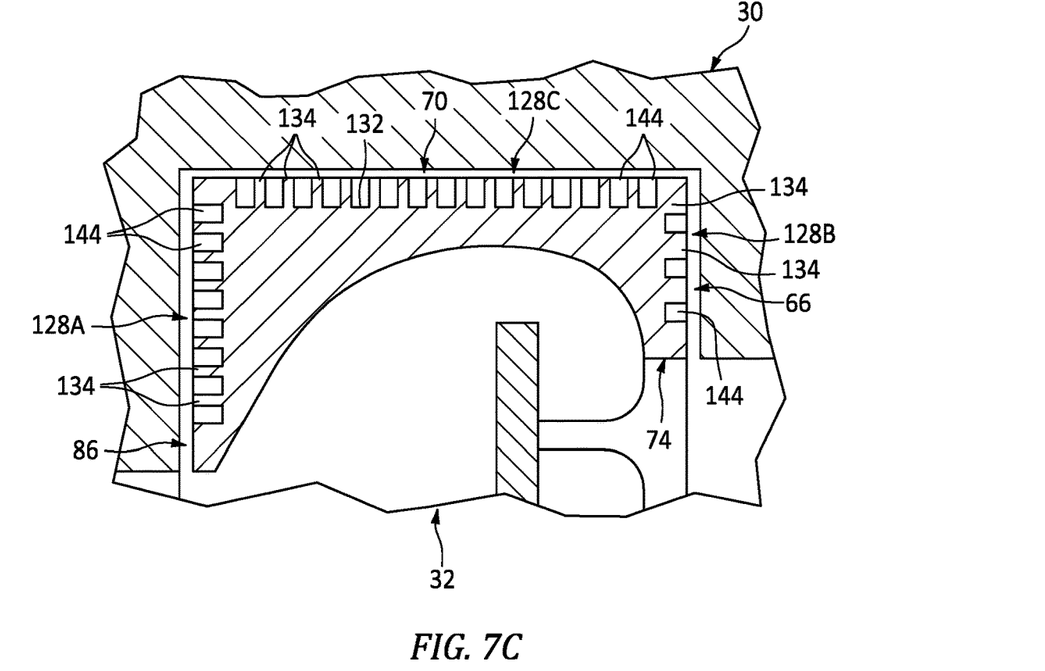

In some embodiments, referring to FIGS. 7A-C, multiple (e.g., each) of the control gaps 128 may be configured with a changing control gap dimension 130 (see FIG. 4) as described above. The rotor shroud 74 of FIGS. 7A-C, for example, includes one or more of the protrusions 134 (and/or the groove(s) 144) at the rotor first side 66, which protrusions 134 project axially in a (e.g., right-to-left) direction out from the shroud base 132. The rotor shroud 74 of FIGS. 7A-C also (or alternatively) includes one or more of the protrusions 134 (and/or the groove(s) 144) at the shroud second side 86, which protrusions 134 project axially in a (e.g., left-to-right) direction out from the shroud base 132. The rotor shroud 74 of FIGS. 7A-C also (or alternatively) includes one or more of the protrusions 134 (and/or the groove(s) 144) at the rotor outer side 70, which protrusions 134 project radially in a radial outward direction out from the shroud base 132.

Figure 8:
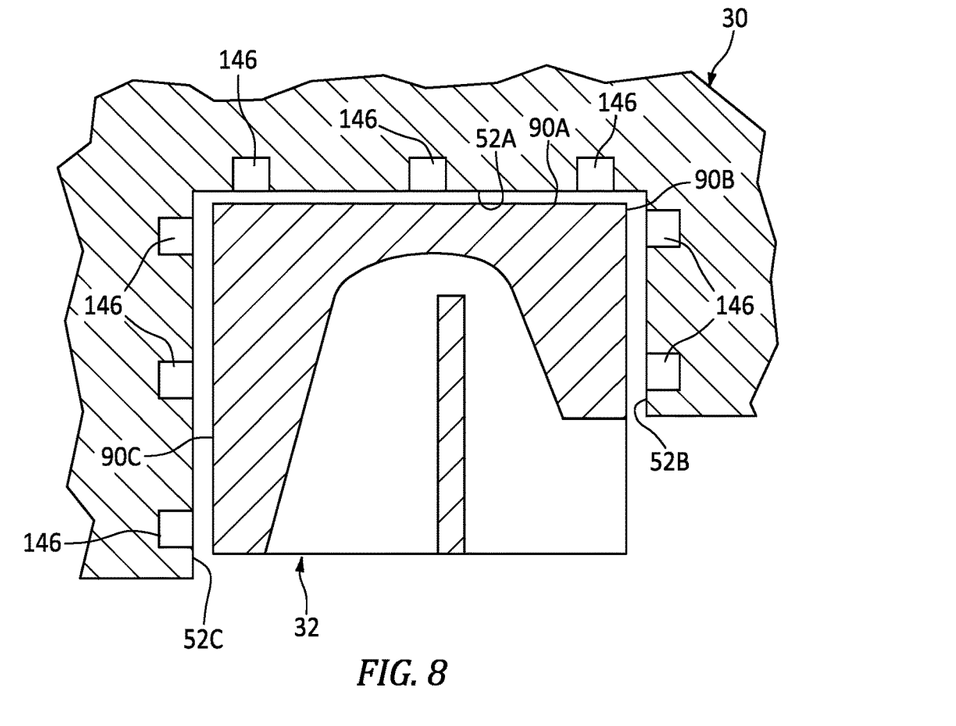
FIG. 8 is a partial side sectional illustration of the interface between the static structure and the impeller rotor where the static structure is configured with multiple grooves.
Figure 9A:
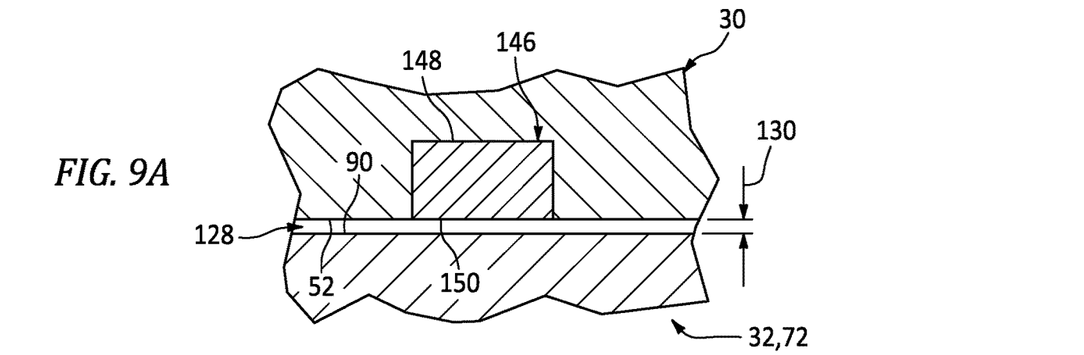
FIGS. 9A-B are partial side sectional illustrations of the interface between the static structure and the impeller rotor where a ring is received within a static structure groove.
Figure 9B:
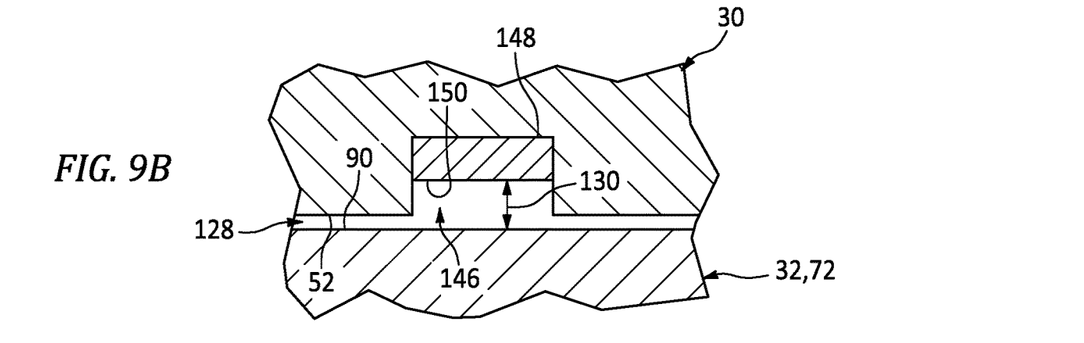
Figure 10A:
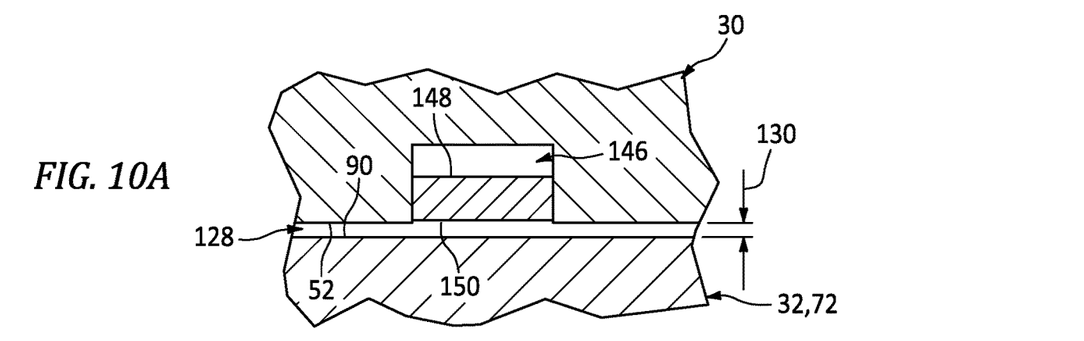
FIGS. 10A-B are partial side sectional illustrations of the interface between the static structure and the impeller rotor where another ring is received within the static structure groove.
Figure 10B:
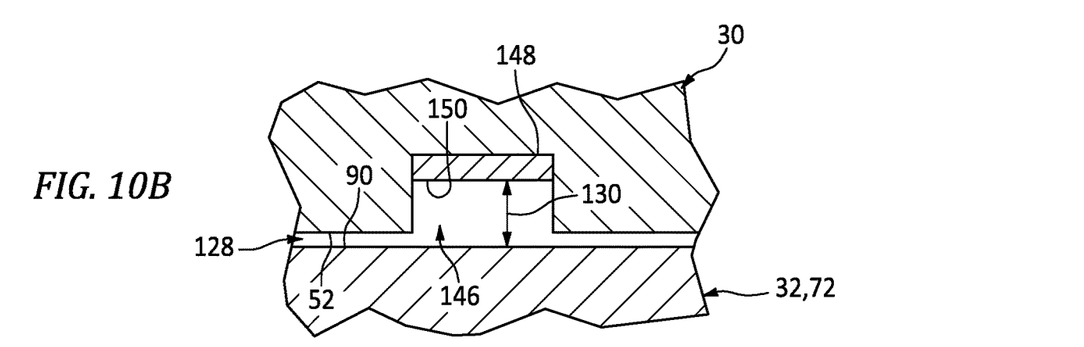

The control gap dimensions 130 are described above as being varied by varying a structure of the rotor shroud 74; e.g., adding the protrusions 134 to the shroud base 132 and/or providing grooves 144 in the rotor shroud 74. The control gap dimensions 130, however, may also or alternatively be varied by configuring one or more grooves 146 into the static structure 30 as shown, for example, in FIG. 8 (static structure with grooves). Locations of the grooves 146, geometries of the grooves 146, spacing between the grooves 146 and/or various other parameters may be selected as described above with respect to the protrusions 134 and/or otherwise.

In some embodiments, referring to FIGS. 9A-B and 10A-B, one or more or each of the grooves 146 in the static structure 30 may be mated with (e.g., receive) a ring 148; e.g., a variable seal ring. This ring 148 is seated within the respective groove 146. An exterior (e.g., cavity inward facing) surface 150 of the ring 148 may be parallel with the adjacent/neighboring cavity surface 52. The ring 148 may be configured to move its exterior surface 150 relative to the cavity surface 52 during different modes of operation. For example, the ring 148 may be constructed from or otherwise include a material with a coefficient of thermal expansion that is different (e.g., greater) than a coefficient of thermal expansion of a material of the static structure 30. With this arrangement, the exterior surface 150 may be relatively close to the opposing shroud surface 90 (see FIGS. 9A and 10A) during, for example, turbine engine startup where the deaerator 22 and the fluid flowing therethrough is relatively cold. This proximity may increase fluid shear and, thus, may facilitate relative rapid heating of the fluid flowing through the control gap 128. The proximity may also further restrict recirculation around the rotor 34. However, when the turbine engine is operating at normal conditions, the deaerator 22 and the fluid flowing therethrough is relatively hot. The exterior surface 150 may therefore be recessed within the groove 146 such that the exterior surface 150 is relatively far from the opposing shroud surface 90 (see FIGS. 9B and 10B). In this condition, the exterior surface 150 is positioned to reduce fluid shear.

In some embodiments, a high (e.g., maximum) value of the control gap dimension 130 may be five (5) to ten (10) times greater than a low (e.g., minimum) value of the control gap dimension 130. For example, the value of the control gap dimension 130 at a point along the shroud surface 90 of FIGS. 5A-D may be five to ten times greater than the value of the control gap dimension 130 at the distal end 136 of the respective protrusion 134. The present disclosure, however, is not limited to the foregoing exemplary dimensional relationship.

The control gap dimension 130 of one or more of the control gaps 128 may be sized between three mils (0.003 inches) and one-hundred mils (0.1 inches). The low value of the control gap dimension 130, for example, may be less than twenty mils (0.02 inches); e.g., between five mils (0.05 inches) and fifteen mils (0.015 inches). In addition or alternatively, the high value of the control gap dimension 130 may be greater than thirty mils (0.03 inches); e.g., between forty mils (0.04 inches) and fifty mils (0.05 inches). The present disclosure, however, is not limited to the foregoing exemplary control gap dimensions 130.

The turbine engine assembly 20 is described above as forming the deaerator 22. The present disclosure, however, is not limited to such an exemplary arrangement. In other examples, for example, the impeller rotor 32 may alternatively be configured as a pump impeller rotor for a fluid pump; e.g., a lubricant pump, etc.

The turbine engine assembly 20 may be included in various types of turbine engines. The turbine engine assembly 20, for example, may be included in a geared turbine engine where a gear train connects one or more shafts to one or more rotors in a fan section, a compressor section and/or any other engine section. Alternatively, the turbine engine assembly 20 may be included in a turbine engine configured without a gear train; e.g., a direct drive engine. The turbine engine assembly 20 may be included in a geared or non-geared turbine engine configured with a single spool, with two spools, or with more than two spools. The turbine engine may be configured as a turbofan engine, a turbojet engine, a turboshaft engine, a turboprop engine, a propan engine, a pusher fan engine, an auxiliary power unit (APU) or any other type of turbine engine. The present disclosure therefore is not limited to any particular types or configurations of turbine engines. The present disclosure is also not limited to turbine engine applications. For example, the assembly 20/the deaerator 22 may be configured to separate or otherwise pump fluids for other types of rotational equipment.

While various embodiments of the present disclosure have been described, it will be apparent to those of ordinary skill in the art that many more embodiments and implementations are possible within the scope of the disclosure. For example, the present disclosure as described herein includes several aspects and embodiments that include particular features. Although these features may be described individually, it is within the scope of the present disclosure that some or all of these features may be combined with any one of the aspects and remain within the scope of the disclosure. Accordingly, the present disclosure is not to be restricted except in light of the attached claims and their equivalents.

What is claimed is:

1. An assembly for a turbine engine, comprising:
a static structure; and
an impeller rotor housed within the static structure, the impeller rotor including a vane structure and a shroud;
the vane structure including a first sidewall, a second sidewall and a plurality of vanes arranged circumferentially about a rotational axis, the first sidewall projecting radially out to an outer tip of the first sidewall, the second sidewall projecting radially out to an outer tip of the second sidewall, the plurality of vanes comprising a first vane, the first vane including a first portion, a second portion and a third portion, the first portion extending axially between the first sidewall and the second sidewall, the second portion extending radially out from the outer tip of the first sidewall to the shroud, and the third portion extending radially out from the outer tip of the second sidewall to the shroud; and
the shroud circumscribing the vane structure, wherein a gap is formed by and extends between the shroud and the static structure, and a dimension of the gap changes as the gap extends along the shroud.

2. The assembly of claim 1, wherein
the shroud includes a base and a protrusion;
the protrusion projects out from the base towards the static structure;
the dimension has a first value when measured between the base and the static structure; and
the dimension has a second value when measured between the protrusion and the static structure that is less than the first value.

3. The assembly of claim 2, wherein the protrusion has a rectangular cross-sectional geometry.

4. The assembly of claim 2, wherein the protrusion has a cross-sectional geometry that tapers as the protrusion projects away from the base and towards the static structure.

5. The assembly of claim 2, wherein
the shroud extends axially along the rotational axis between an upstream end and a downstream end; and
the protrusion is arranged at the upstream end and projects axially out from the base.

6. The assembly of claim 2, wherein
the shroud extends axially along the rotational axis between an upstream end and a downstream end; and the protrusion is arranged at the downstream end and projects axially out from the base.

7. The assembly of claim 2, wherein the protrusion is arranged at a radial outer side of the shroud and projects radially out from the base.

8. The assembly of claim 2, wherein
the protrusion is a first protrusion, and the first protrusion projects out from the base towards the static structure in a first direction; and
the shroud further includes a second protrusion, and the second protrusion projects out from the base towards the static structure in a second direction that is different than the first direction.

9. The assembly of claim 2, wherein
the protrusion is a first protrusion, and the first protrusion projects out from the base towards the static structure in a first direction; and
the shroud further includes a second protrusion, and the second protrusion projects out from the base towards the static structure in the first direction.

10. The assembly of claim 1, wherein
a groove projects into the static structure from a cavity surface to a groove surface;
the dimension has a first value when measured between the impeller rotor and the groove surface; and
the dimension has a second value when measured between the impeller rotor and the cavity surface that is less than the first value.

11. The assembly of claim 10, wherein the groove projects radially outward into the static structure from the cavity surface to the groove surface.

12. The assembly of claim 10, wherein the groove projects axially into the static structure from the cavity surface to the groove surface.

13. The assembly of claim 1, wherein
the static structure comprises a base and a ring;
a groove projects into the base from a cavity surface formed by the base;
the ring is arranged within the groove and has a ring surface;
the dimension has a first value when measured between the shroud and the cavity surface; and
the dimension has a second value when measured between the shroud and the ring surface that is different than the first value during at least a first mode of operation.

14. The assembly of claim 13, wherein the dimension has a third value when measured between the shroud and the ring surface that is different than the second value during at least a second mode of operation.

15. The assembly of claim 13, wherein
the base comprises first material with a first coefficient of thermal expansion; and
the ring comprises second material with a second coefficient of thermal expansion that is different than the first coefficient of thermal expansion.

16. The assembly of claim 1, wherein the impeller rotor comprises a deaerator impeller rotor.

* * * * *